(12) United States Patent
Shin et al.

(10) Patent No.: US 12,321,475 B2
(45) Date of Patent: Jun. 3, 2025

(54) STORAGE DEVICE FOR PERFORMING ACCESS AUTHORITY CONTROL AND OPERATING METHOD THEREOF

(71) Applicant: Samsung Electronics Co., Ltd., Suwon-si (KR)

(72) Inventors: Yeonwoo Shin, Suwon-si (KR); Hanju Lee, Suwon-si (KR); Seonbong Kim, Suwon-si (KR); Seungmoon Woo, Suwon-si (KR); Yongho Song, Suwon-si (KR); Kwanghee Choi, Suwon-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 263 days.

(21) Appl. No.: 18/057,337

(22) Filed: Nov. 21, 2022

(65) Prior Publication Data

US 2023/0237184 A1  Jul. 27, 2023

(30) Foreign Application Priority Data

Jan. 26, 2022 (KR) .................. 10-2022-0011789
Jun. 7, 2022 (KR) .................. 10-2022-0069111

(51) Int. Cl.
*G06F 21/62* (2013.01)
*G06F 9/455* (2018.01)

(52) U.S. Cl.
CPC ...... *G06F 21/6218* (2013.01); *G06F 9/45558* (2013.01); *G06F 2009/45587* (2013.01)

(58) Field of Classification Search
CPC ............. G06F 21/6218; G06F 9/45558; G06F 2009/45587

(Continued)

(56) References Cited

U.S. PATENT DOCUMENTS 9,465,750 B2  10/2016  Nakada et al.
9,529,773 B2  12/2016  Hussain et al.
(Continued)

FOREIGN PATENT DOCUMENTS

CN        112000439 A      11/2020
KR  10-20190033413 A       3/2019
(Continued)

OTHER PUBLICATIONS

Extended European Search Report, dated Jun. 2, 2023, issued in corresponding European Patent Application No. 22213642.6.
(Continued)

*Primary Examiner* — Michael S McNally
(74) *Attorney, Agent, or Firm* — Harness, Dickey & Pierce, P.L.C.

(57) ABSTRACT

A storage device for performing an access authority control and an operating method thereof are disclosed. The storage device including processing circuitry configured to store a plurality of security information associated with the plurality of namespaces in response to a command from the host, each of the security information including virtual machine information associated with a corresponding one of the plurality of virtual machines and unique information associated with the corresponding virtual machine, the virtual machine information including an identifier for the corresponding virtual machine, and the unique information including unique information uniquely set for the corresponding virtual machine, extract at least first information by decoding a data access request received from the host device, and abort processing of the data access request based on the security information and the extracted at least one first information.

19 Claims, 13 Drawing Sheets

(58) Field of Classification Search
USPC .......................................................... 726/26
See application file for complete search history.

(56) References Cited

U.S. PATENT DOCUMENTS

| | | | |
|---|---|---|---|
| 10,089,134 | B2 | 10/2018 | Geml et al. |
| 10,275,361 | B2 | 4/2019 | Ish et al. |
| 11,048,541 | B2 | 6/2021 | Qiu et al. |
| 11,126,453 | B2 | 9/2021 | Keeth et al. |
| 11,360,680 | B2 | 6/2022 | Isozaki et al. |
| 11,443,040 | B2 | 9/2022 | Buendgen et al. |
| 2014/0108701 | A1 | 4/2014 | Liljeberg |
| 2015/0143134 | A1 | 5/2015 | Hashimoto |
| 2018/0004559 | A1* | 1/2018 | Geml ................... G06F 21/6209 |
| 2018/0188985 | A1* | 7/2018 | Wysocki .............. G06F 9/45558 |
| 2020/0133878 | A1 | 4/2020 | Asaro et al. |
| 2021/0150074 | A1 | 5/2021 | Niell et al. |
| 2023/0376340 | A1* | 11/2023 | Choi ................... G06F 9/44505 |

FOREIGN PATENT DOCUMENTS

| | | |
|---|---|---|
| KR | 102042643 B1 | 12/2019 |
| KR | 10-20200032654 A | 3/2020 |
| KR | 10-20210121170 A | 10/2021 |
| KR | 10-20210156190 A | 12/2021 |
| TW | I625674 B | 6/2018 |

OTHER PUBLICATIONS

KR Notice of Allowance, dated May 1, 2023, issued in corresponding Korean Patent Application No. 10-2022-0069111.

TW Office Action for corresponding Taiwan Patent Application No. 111148405 issued on Jan. 3, 2025.

* cited by examiner

STORAGE DEVICE FOR PERFORMING ACCESS AUTHORITY CONTROL AND OPERATING METHOD THEREOF

CROSS-REFERENCE TO RELATED APPLICATIONS

This U.S. non-provisional application is based on and claims the benefit of priority under 35 U.S.C. § 119 to Korean Patent Application Nos. 10-2022-0011789, filed on Jan. 26, 2022, and 10-2022-0069111, filed on Jun. 7, 2022, in the Korean Intellectual Property Office, the disclosures of each of which are incorporated by reference herein in their entireties.

BACKGROUND

Various example embodiments of the inventive concepts relate to a storage device, a system including the storage device, a method of operating the storage device, and/or a non-transitory computer readable medium storing computer readable instructions for performing the method of operating the storage device. More particularly, one or more of the example embodiments are related to a storage device for performing an access authority control in response to a data access request from a host, a system including the storage device, an operating method thereof, and/or a non-transitory computer readable medium storing computer readable instructions for performing the method of operating the storage device.

An example of storage devices based on a flash memory device is a solid state drive (SSD). Interfaces used in storage systems, such as an SSD, include a serial advanced technology attachment (SATA) interface, a peripheral component interconnect express (PCIe) interface, a serial attached small computer system interface (serial attached SCSI (SAS)), a compute express link (CXL) interface, and the like, and in addition, an interface based on a PCIe bus, such as a nonvolatile memory express (NVMe) interface, has been proposed.

A storage device may be shared by a plurality of hosts, and in addition, each host may drive a plurality of virtual machines (VMs), wherein the plurality of VMs of each host may share the storage device. For example, a storage medium in a storage device may include a plurality of namespaces, and different VMs may have access authorities to different namespaces. In this case, a security policy by which a malicious access attempt without a normal and/or valid access authority may be blocked is not employed in the storage device, thereby decreasing the security of user data.

SUMMARY

Various example embodiments of the inventive concepts provide a storage device capable of blocking a malicious access attempt without a normal and/or valid access authority by employing a security policy in the storage device, a system including the storage device, and/or an operating method thereof.

According to at least one example embodiment of the inventive concepts, there is provided a storage device including nonvolatile memory comprising a plurality of cell blocks, the plurality of cell blocks allocated into a plurality of namespaces, each of the plurality of namespaces associated with at least one virtual machine of a plurality of virtual machines generated by the host device, and processing circuitry configured to, store a plurality of security information associated with the plurality of namespaces in response to a command from the host, each of the security information including virtual machine information associated with a corresponding one of the plurality of virtual machines and unique information associated with the corresponding virtual machine, the virtual machine information including an identifier for the corresponding virtual machine, and the unique information including unique information uniquely set for the corresponding virtual machine, extract at least first information by decoding a data access request received from the host device, and abort processing of the data access request based on the security information and the extracted at least one first information.

According to at least one example embodiment of the inventive concepts, there is provided an operating method of a storage device, the operating method including receiving a setting command from the host device, storing a plurality of security information, in response to the setting command, the plurality of security information including a plurality of virtual machine information associated with each virtual machine of a plurality of virtual machines, the virtual machines being generated by the host device, each of the virtual machine information including a memory address indicating a position in a host memory of an input/output queue associated with the associated virtual machine, and a namespace identifier (ID) indicating a namespace associated with the virtual machine, and selectively aborting processing of a read request received from the host device based on the security information and information extracted from the read request.

According to at least one example embodiment of the inventive concepts, there is provided a host device including a host memory comprising a plurality of input/output queues allocated to at least one virtual machine of a plurality of virtual machines, and processing circuitry configured to manage generation of the plurality of virtual machines and the allocation of the plurality of input/output queues in the host memory to the plurality of virtual machines, each of the virtual machines configured to generate a read request for accessing the plurality of namespaces through independent paths according to virtualization technology, and transmit a setting command to a storage device, the setting information including a plurality of security information associated with the plurality of virtual machines, each of the plurality of security information including virtual machine information identifying the associated virtual machine, a memory address indicating a position of an input/output queue allocated to the associated virtual machine, and a namespace identifier (ID) indicating a namespace associated with the virtual machine.

BRIEF DESCRIPTION OF THE DRAWINGS

Various example embodiments of the inventive concepts will be more clearly understood from the following detailed description taken in conjunction with the accompanying drawings in which.

DETAILED DESCRIPTION

Hereinafter, various example embodiments of the inventive concepts are described in detail with reference to the accompanying drawings.

Figure 1:
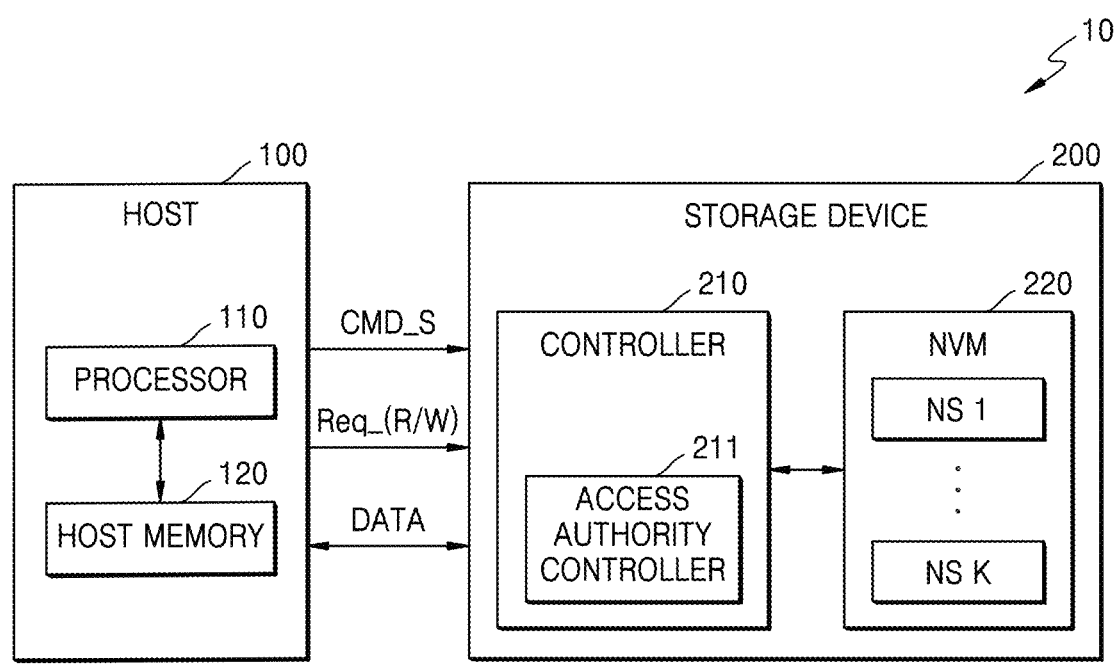
FIG. 1 is a block diagram illustrating a data processing system according to at least one example embodiment.

FIG. 1 is a block diagram illustrating a data processing system 10 according to at least one example embodiment.

Referring to FIG. 1, the data processing system 10 may include at least one host 100 and/or a storage device 200, etc., but the example embodiments are not limited thereto, and for example, the data processing system 10 may include a greater or lesser number of constituent components, etc. The storage device 200 may include at least one controller 210 and at least one nonvolatile memory (NVM) 220, etc. The host 100 (e.g., a host device, an external host, an external computer, a host system, etc.) may provide data write and/or read requests to the storage device 200. In addition, in response to a data delete request from the host 100, the storage device 200 may perform a delete operation on data in a region indicated by the host 100. According to some example embodiments, the host 100 may include a plurality of hosts, etc.

In at least one example embodiment, the storage device 200 includes at least one memory device and/or at least one controller may be implemented as processing circuitry which may be configured to control the memory device and may be defined by various terms other than a storage device. For example, the storage device 200 may be referred to as a memory system, a storage system, a cloud storage system, a distributed storage system, etc., and the controller 210 may be referred to as a storage controller, a memory controller, or the like. The processing circuitry may include hardware including logic circuits; a hardware/software combination such as a processor executing software and/or firmware; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc., but is not limited thereto.

The storage device 200 may include storage media storing data in response to a request from the host 100. For example, the storage device 200 may include one or more solid state drives (SSDs), but is not limited thereto. When the storage device 200 includes an SSD, the NVM 220 may include a plurality of flash memory chips (e.g., NAND memory chips, VNAND memory chips, etc.) storing data and the NVM 220 may be nonvolatile. Hereinafter, in the description of the example embodiments, it is assumed that the storage device 200 includes one or more flash memory chips, but the example embodiments are not limited thereto.

As another example, the storage device 200 may include various types of other memories in addition to, or in place of the NVM. For example, the storage device 200 may include an NVM, and various types of memories, such as magnetic random access memory (MRAM), spin-transfer torque MRAM, conductive bridging RAM (CBRAM), ferroelectric RAM (FeRAM), phase RAM (PRAM), resistive RAM, nanotube RAM, polymer RAM (PoRAM), a nano floating gate memory (NFGM), a holographic memory, a molecular electronics memory device, and/or an insulator resistance change memory, etc., may be applied to the NVM.

The host 100 may communicate with the storage device 200 through various interfaces. For example, the host 100 may communicate with the storage device 200 through various interfaces, such as a universal serial bus (USB) interface, a multimedia card (MMC) interface, a PCIe interface, an advanced technology attachment (ATA) interface, a SATA interface, a parallel ATA (PATA) interface, a SCSI, a SAS interface, an enhanced small disk interface (ESDI), an integrated drive electronics (IDE) interface, a CXL interface, and/or an NVM express (NVMe) interface, etc. According to some example embodiments, it is assumed that, in the data processing system 10, the host 100 and the storage device 200 perform an NVMe-based interface through a PCIe bus, but the example embodiments are not limited thereto.

According to at least one example embodiment, the host 100 may include at least one processor 110 and/or at least one host memory 120, etc., but is not limited thereto. The processor 110 may control memory operations, such as data write and/or data read, etc., performed on the storage device 200 by executing software stored in the host memory 120. In at least one example embodiment, the host 100 may encode and/or decode at least one packet satisfying a standard defined in the NVMe interface. The host 100 may store, in the host memory 120, at least one packet corresponding to a write and/or read request and store, in the host memory 120, a completion response from the storage device 200 in response to the memory request (e.g., write and/or read request, etc.). In some example embodiments below, each of the write and read requests of the host 100 for the storage device 200 may correspond to an access request Req, and at least one packet provided by the host 100 may be referred to as a request and/or a command, etc. According to at least one example embodiment, the processor 110 may be implemented as processing circuitry, and may include hardware including logic circuits; a hardware/software combination such as a processor executing software and/or firmware; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc., but is not limited thereto.

In at least one example embodiment, the controller 210 (e.g., the processing circuitry) may include an access authority controller 211, and the NVM 220 may include a plurality of namespaces (NSs), but the example embodiments are not limited thereto. Each of the flash memory chips included in the NVM 220 may include a memory cell array, and the memory cell array may include one or more cell blocks. FIG. 1 illustrates a case where the NVM 220 includes a plurality of namespaces, e.g., first to Kth NSs NS 1 to NS K. A plurality of cell blocks included in the NVM 220 may be classified into (e.g., allocated to and/or assigned to) the first to Kth NSs NS 1 to NS K, and one or more cell blocks may be allocated to each of the first to Kth NSs NS 1 to NS K.

In at least one example embodiment, the host 100 may generate and/or execute a plurality of virtual machines (VMs) based on control by the processor 110. For example, the host 100 may manage NSs by using virtualization technology, and the plurality of VMs may commonly access the same storage device, but the example embodiments are not limited thereto. For example, the host memory 120 may include a VM management module (not shown) configured to enable access to the storage device 200 based on the virtualization technology, and the processor 110 may execute the VM management module to generate the plurality of VMs. The plurality of VMs may share resources, such as at least one processor, memory, firmware, and/or software, etc., in the host 100, but in terms of the storage device 200, it may be virtually recognized that each of the plurality of VMs accesses data as separate virtual hardware. In other words, while there is only one physical hardware, the plurality of VMs may virtually access the same physical hardware as multiple virtual hardware, etc.

The first to Nth NSs NS 1 to NS K may be associated with and/or allocated to the plurality of VMs. The storage device 200 may associate the first to Kth NSs NS 1 to NS K with the plurality of VMs based on control by the host 100, and for example, each VM may access data associated with NS by being associated with at least one NS. Each VM may be associated with one or more NSs, and additionally and/or alternatively, at least two VMs may share any one NS.

The host 100 may generate any number of VMs, and a process of authenticating an access authority of one or more of the VMs to NSs may be performed by the host 100. For example, the host 100 may manage identifier (ID) information of the first to Kth NSs NS 1 to NS K (hereinafter, referred to as NS IDs) when the first to Kth NSs NS 1 to NS K are generated, and may provide an NS ID associated with each VM to the corresponding VMs. In addition, each of the plurality of VMs may generate an access request Req including an NS ID for accessing data in an allocated NS and transmit the access request Req to the storage device 200, etc.

However, when a VM is seized by a malicious user, computer virus, etc., and there is an attempt to access a particular NS in the storage device 200 through the seized VM, the storage device 200 may unknowingly decode a malicious and/or invalid access request Req from the host 100, read data from the particular NS indicated by the access request Req, and provide the read data to the host 100. In this case, the data processing system 10, in which security is significant, may provide data to a malicious user and/or computer virus without a normal and/or valid access authority, thereby weakening and/or compromising data security of the storage device 200, the data processing system 10, and/or any persons with information stored in the storage device 200, etc.

According to at least one example embodiment, in response to at least one setting command CMD_S from the host 100, security information (not shown) used to determine an access authority may be set and/or stored in the access authority controller 211. The access authority controller 211 may determine whether an access request Req from the host 100 is a valid request by a user (and/or VM) with a normal and/or valid authority based on a comparison between information extracted from the access request Req from the host 100 and the security information stored in the access authority controller 211, but is not limited thereto. If the access authority controller 211 determines that the access request Req is a request by a VM with a normal and/or valid authority, the controller 210 may perform a control operation to normally process the access request Req from the host 100, etc. Otherwise, if it the access authority controller 211 determines that the access request Req is not a valid request by a VM with a normal and/or valid authority (e.g., the access request Req is a malicious request, a fraudulent request, etc.), the access authority controller 211 may abort processing of the access request Req from the host 100 to reduce and/or prevent data from being read and/or written from and/or into the NVM 220 by a malicious, invalid, and/or fraudulent access.

In at least one example embodiment, the security information set in the access authority controller 211 may include information associated with each of the plurality of VMs generated in the host 100. For example, the security information may include a plurality of entries corresponding to the plurality of VMs, and each entry may include mapping information between VM information indicating an identity of the respective VM and at least one piece of unique information uniquely allocated to the respective VM.

For example, the host 100 may allocate a storage space at a particular, unique, and/or desired position (e.g., memory location, etc.) in the host memory 120 to an input/output queue (IOQ) for each VM, and the unique information may include a memory address indicating the position of the allocated IOQ in the host memory 120. For example, the IOQ may include a storage space included in a certain and/or desired address range, and the memory address may include information related to the address range. In addition, the host 100 may allocate at least one NS to each VM, and the unique information may include an NS ID indicating the NS allocated to each VM. That is, each entry in the security information may include VM information of any individual VM, and a memory address and/or an NS ID mapped to the VM information, etc., but the example embodiments are not limited thereto.

According to at least one example embodiment, the controller 210 may decode the access request Req from the host 100 and extract, from the decoded access request Req, at least one piece of information to be compared to the security information. The access authority controller 211 may decode the access request Req to determine information about, related to, and/or corresponding to the VM which generated the access request Req and extract a memory address indicating the position of the IOQ in association with a data access and/or an NS ID, etc., for which the data access is requested. The access authority controller 211 may determine a memory address and/or an NS ID mapped to the determined VM information from the security information. In addition, the access authority controller 211 may determine whether the access request Req is an access by a VM with a normal and/or valid authority based on the decoded request information and the security information, e.g., by comparing the memory address and the NS ID extracted from the access request Req to the memory address and the NS ID included in the security information, etc. For example, the access authority controller 211 may determine whether the memory address extracted from the access request Req is within a memory address range included in the security information, and in addition, the access authority controller 211 may determine whether the NS ID extracted from the access request Req matches the NS ID included in the security information, etc.

The controller 210 may abort processing of the access request Req based on the determination result of the access authority controller 211, thereby reinforcing and/or improving user data security. For example, when a malicious user (e.g., unauthorized user, computer virus, etc.) without a normal and/or valid access authority seizes a particular VM (e.g., a second VM) and attempts to access an NS associated with another VM (e.g., a first VM) through an IOQ in the host memory 120 allocated to the first VM, at least one of the memory address and the NS ID extracted from the access request Req may be different from at least one of a memory address and an NS ID mapped to VM information indicating the first VM included in security information. Accordingly, processing of the access request Req from the second VM without normal and/or valid access authority may be aborted by the controller 210. In addition, when the malicious user does not know at least one of a memory address of the IOQ allocated to the first VM and the NS ID associated with the first VM, the processing of the access request Req from the second VM without the normal and/or valid access authority may be aborted by the controller 210 through a comparison procedure using the security information in the storage device 200, etc.

In at least one example embodiment, in the access authority controller 211, a circuit configured to store the security information and a circuit configured to determine an access authority may be implemented using a single circuit block. Additionally, in the access authority controller 211, a storage circuit configured to store the security information and the circuit configured to determine an access authority may be implemented by separate circuit blocks. In addition, the storage circuit configured to store the security information may be implemented using volatile memory and/or an NVM, and for example, when the storage circuit is implemented using volatile memory, the host 100 may control an operation of setting the security information for the storage device 200 when initially operating the data processing system 10, but the example embodiments are not limited thereto.

Figure 2:
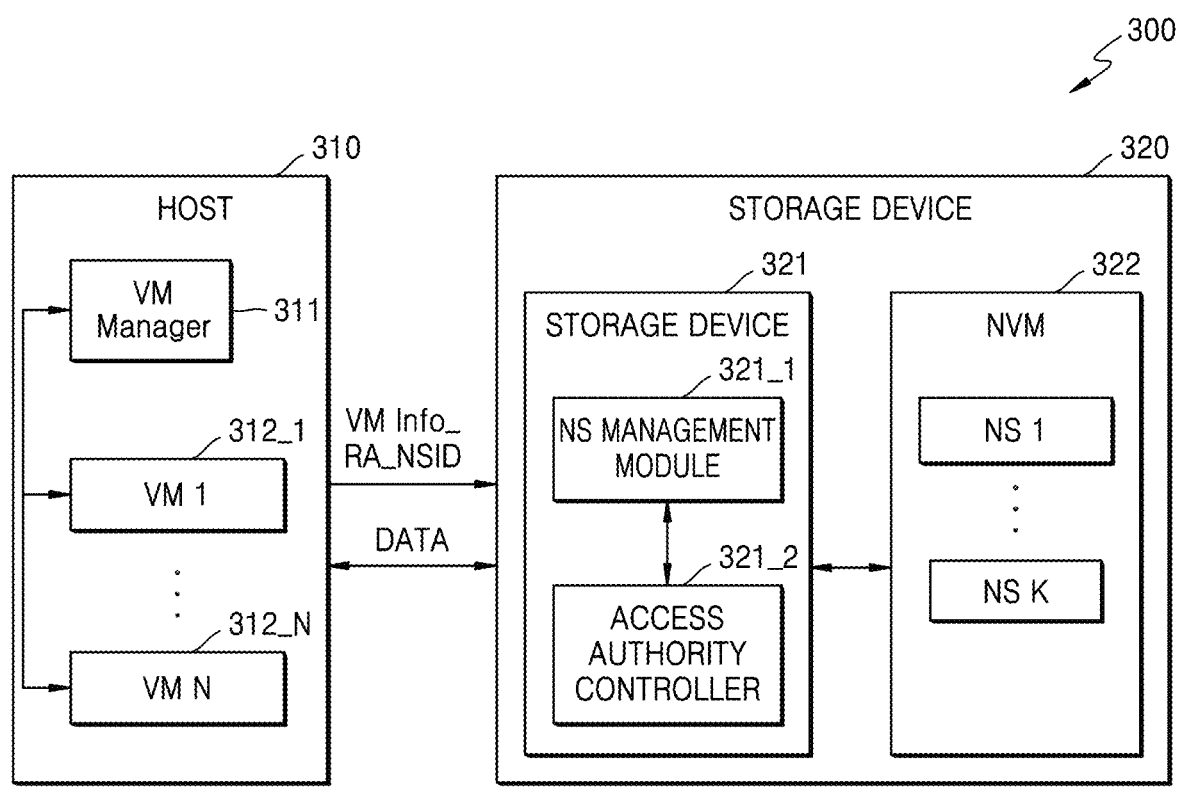
FIG. 2 is a block diagram illustrating a data processing system to which virtualization technology is applied, according to at least one example embodiment.

FIG. 2 is a block diagram illustrating a data processing system 300 to which the virtualization technology is applied, according to at least one example embodiment.

Referring to FIG. 2, the data processing system 300 may include at least one host 310 and at least one storage device 320, etc., and the storage device 320 may include at least one controller 321 and at least one NVM 322, etc., but the example embodiments are not limited thereto. The host 310 may include at least one VM manager 311 and a plurality of VMs, e.g., first to Nth VMs 312_1 to 312_N, etc. The VM manager 311 may be implemented by hardware or a combination of hardware and software, and for example, a function of the VM manager 311 may be implemented by a processor executing software, etc. The VM manager 311 may be referred to as a hypervisor and configured to generate and execute the first to Nth VMs 312_1 to 312_N, but the example embodiments are not limited thereto.

The host 310 may request to generate and/or delete NSs associated with each of the first to Nth VMs 312_1 to 312_N, but is not limited thereto. For example, the storage device 320 may generate the first to Kth NSs NS 1 to NS K as a plurality of NSs based on control and/or instruction by the host 310. According to at least one example embodiment, a plurality of cell blocks included in the NVM 322 may be classified into and/or allocated as the first to Kth NSs NS 1 to NS K, each of the first to Nth VMs 312_1 to 312_N may be associated with at least one NS and may generate an access request for accessing its associated NS. For example, when each of the first to Nth VMs 312_1 to 312_N generates an access request, an NS ID indicating an NS having an access authority may be included in the access request.

The controller 321 may include an NS management module 321_1 and/or an access authority controller 321_2, but is not limited thereto. The NS management module 321_1 may manage an operation of generating and/or deleting the first to Kth NSs NS 1 to NS K in response to at least one request from the host 310. In addition, the NS management module 321_1 may control at least one access operation to the first to Kth NSs NS 1 to NS K in response to at least one request from the host 310, and for example, the NS management module 321_1 may proceed with and/or abort processing of an access request from the host 310 based on control and/or instruction by the access authority controller 321_2. However, the example embodiments are not limited thereto, and the controller 321 may include additional components configured to, for example, control a read/write operation performed on the first to Kth NSs NS 1 to NS K, and/or control the additional components, etc., according to and/or based on access authority determination to process an access request and/or abort the processing of the access request.

The access authority controller 321_2 may include a security information storage circuit, and the security information storage circuit may store security information including a plurality of entries in response to a setting command (e.g., allocation command, etc.) from the host 310, according to at least one example embodiment. For example, according to at least one example embodiment, the plurality of entries may correspond to VMs generated in the host 310, and each entry may include VM information VM Info regarding and/or corresponding to a VM and/or mapping information, as an example of unique information, between a memory address RA indicating a position of an IOQ allocated to the VM and an NS ID NSID, but the example embodiments are not limited thereto, and for example, other unique information may be used specific to each VM. The access authority controller 321_2 may receive an access request (e.g., a read request Req_R) from the host 310, extract one or more pieces of information through a decoding operation on the read request Req_R, and determine whether to abort processing of the read request Req_R based on a comparison between the extracted information and the security information stored in the security information storage circuit. In other words, the access authority controller 321_2 may determine whether to abort the read request Req_R based on the extracted information and the security information stored in the security information storage circuit, etc.

As an example of an operation of the first VM VM 1 to access an NS (e.g., the first NS NS 1) having a normal and/or valid authority, the first VM VM 1 may generate the read request Req_R including the memory address RA indicating an IOQ allocated to the first VM VM 1 and the NS ID NSID indicating the first NS NS 1. For example, in a packet generation process based on an NVMe interface, VM information indicating the first VM VM 1 may be added to the read request Req_R, but the example embodiments are not limited thereto.

The read request Req_R from the first VM VM 1 may be provided to the storage device 320, and the controller 321 may decode the read request Req_R to extract the VM information indicating the first VM VM 1, and the memory address RA and the NS ID NSID included in the read request Req_R. If the first VM VM 1 has a normal and/or valid access authority to the first NS NS 1, the memory address RA and the NS ID NSID mapped to the VM information indicating the first VM VM 1, which is included in the security information stored in the access authority controller 321_2, may match information extracted from the read request Req_R, and accordingly, the read request Req_R may be normally processed (e.g., may be permitted to be executed, etc.).

Otherwise, if the second VM VM 2 without a normal and/or valid access authority to the first NS NS 1 transmits a read request Req_R as an attempt to access the first NS NS 1, information extracted by decoding the read request Req_R may not match information included in the security information. For example, a memory address RA and an NS ID NSID mapped to VM information indicating the second VM VM 2, which is included in the security information stored in the access authority controller 321_2, may include information allocated to the second VM VM 2, and/or in correspondence to the second VM VM 2, in a setting process by the host 310, accordingly, at least one of the memory address RA and the NS ID NSID included in the security information may be different from at least one of the memory address RA and the NS ID NSID extracted from the read request Req_R. Consequently, processing of the read request Req_R by a malicious user and/or computer virus may be aborted (e.g., not executed).

Figure 3:
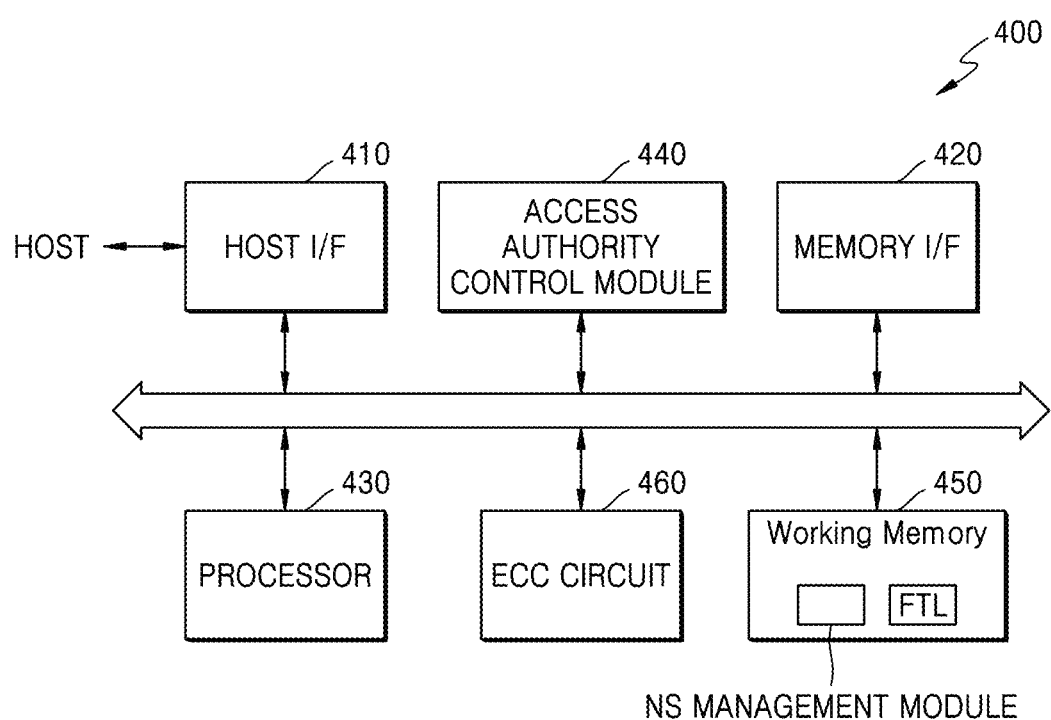
FIG. 3 is a block diagram illustrating an implementation example of a controller according to at least one example embodiment.

FIG. 3 is a block diagram illustrating an implementation example of a controller 400 according to at least one example embodiment.

Referring to FIG. 3, the controller 400 may include a host interface (I/F) circuit 410, a memory I/F circuit 420, at least one processor 430, an access authority control module 440, a working memory 450, and/or an error correction code (ECC) circuit 460, etc., but the example embodiments are not limited thereto. In at least one example embodiment, various types of software executable by the processor 430 may be loaded in the working memory 450, and for example, when an NVM controlled by the controller 400 includes a flash memory device, a flash translation layer (FTL) may be loaded in the working memory 450, etc. In addition, in another implementation example, when an NS management function according to at least one example embodiment is implemented by software, an NS management module may be loaded in the working memory 450 for execution by the processor 430, etc. The working memory 450 may be implemented in various forms, such as RAM, read-only memory (ROM), electronically erasable programmable ROM (EEPROM), flash memory, and/or other memory technology.

The processor 430 may control a general operation of a storage device by executing the various kinds of software stored in the working memory 450. The host I/F circuit 410 may perform communication with a host according to a certain and/or desired interface, and for example, the controller 400 may be connected to the host via a PCIe bus and communicate with the host according to an NVMe interface, but the example embodiments are not limited thereto. In addition, the memory I/F circuit 420 may provide an interface with a plurality of storage media included in an NVM, and for example, the memory I/F circuit 420 may perform independent communication with the plurality of storage media through a plurality of channels, respectively. In addition, the ECC circuit 460 may perform an operation for error detection and correction of data to be stored in and/or data already stored on the storage device, and for example, the ECC circuit 460 may generate an ECC parity from write data and perform an error detection and correction operation by using read data and an ECC parity corresponding to the read data, but the example embodiments are not limited thereto.

According to at least one example embodiment, the access authority control module 440 may include hardware components and/or software components to be executed on hardware, etc., and when the access authority control module 440 includes software components, software included in the access authority control module 440 may be loaded in the working memory 450 for execution by the processor 430, etc. The access authority control module 440 may determine whether a data access request from the host is an access request from a VM with a normal and/or valid authority, in response to the data access request. For example, according to some example embodiments, security information may be stored in the access authority control module 440 based on a setting command from the host, the access authority control module 440 may decode an access request from the host to extract various kinds of information included in the access request, and compare the extracted information to the security information to execute and/or abort processing of the access request from the host, etc.

Figure 4:
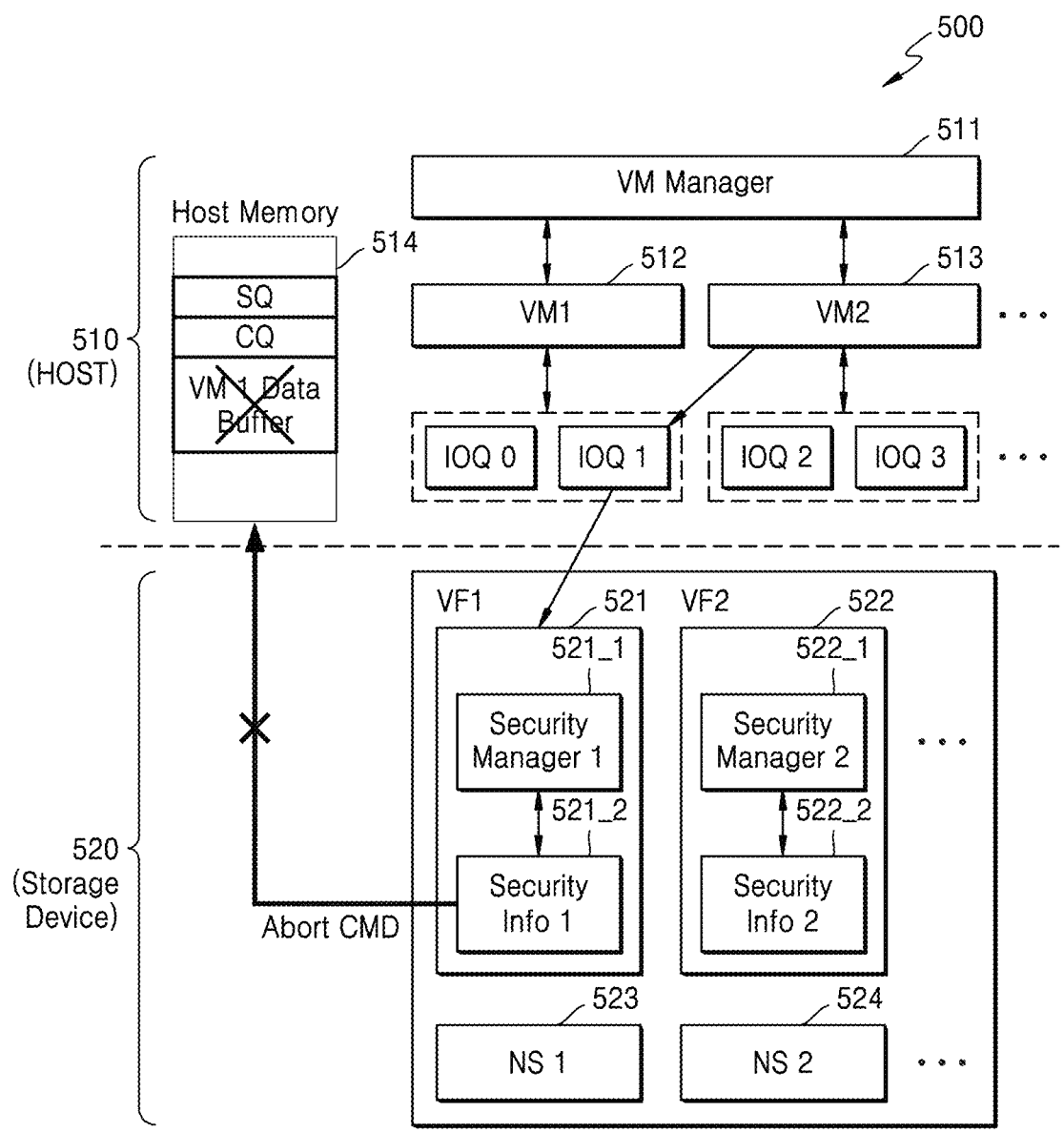
FIG. 4 is a block diagram illustrating a particular implementation example of a data processing system according to at least one example embodiment.

FIG. 4 is a block diagram illustrating a particular implementation example of a data processing system 500 according to at least one example embodiment.

Referring to FIG. 4, the data processing system 500 may include at least one host 510 and/or at least one storage device 520, the host 510 may include a VM manager 511, and a plurality of VMs may be generated by the host 510 based on controls and/or instructions by the VM manager 511, but the example embodiments are not limited thereto. FIG. 4 illustrates a case where first and second VMs 512 and 513 are generated, but the example embodiments are not limited thereto.

The VM manager 511 may allocate an IOQ to a VM in response to a request (e.g., an IOQ allocation request) from the VM. For example, the host 510 may include a host memory 514, and although FIG. 4 shows that IOQs are separated from the host memory 514, the IOQs may correspond to storage spaces included in the host memory 514, but are not limited thereto, and may be allocated in storage outside of the host memory 514, etc. In at least one example embodiment, first and second IOQs IOQ 0 and IOQ 1 may be allocated to the first VM 512, and third and fourth IOQs IOQ 2 and IOQ 3 may be allocated to the second VM 513, but the example embodiments are not limited thereto. In addition, address information (e.g., a memory address) indicating a position of an IOQ allocated to each VM may be provided to the first and second VMs 512 and 513. In addition, each IOQ may include a submission queue (SQ) storing a packet to be transmitted to the storage device 520 and/or a completion queue (CQ) storing a packet transmitted from the storage device 520, etc.

The storage device 520 may include a controller (e.g., a memory controller, etc.), and when a single root input/output virtualization (SR-IOV) function according to an NVMe interface is provided between the host 510 and the storage device 520, the storage device 520 may generate a plurality of virtual functions (VFs), for example, first and second VFs 521 and 522 corresponding to the first and second VMs 512 and 513, but the example embodiments are not limited thereto. The first and second VFs 521 and 522 may be implemented in and/or generated by the controller of the storage device 520, in response to a request from the host 510, and may independently process a data access request from the host 510, etc. In addition, because each of the first and second VFs 521 and 522 processes requests from its corresponding VM, each of the first and second VMs 512 and 513 may perform data access to the storage device 520 through independent paths.

As an example of a read request from the host 510, each of the first and second VFs 521 and 522 may determine whether the read request from the host 510 is a read request from a VM with a normal and/or valid authority. An access authority controller according to some example embodiments may be implemented in each of the first and second VFs 521 and 522 and may include, for example, a security manager and/or a security information storage circuit (e.g., a portion of the security information storage circuit allocated to the virtual function), etc., but the example embodiments are not limited thereto. For example, as shown in FIG. 4, the first VF 521 may include a first security manager 521_1 and a first security information storage circuit 521_2, and the second VF 522 may include a second security manager 522_1 and a second security information storage circuit 522_2, but are not limited thereto. In addition, an NVM may include a plurality of NSs, and FIG. 4 illustrates a case where first and second NSs 523 and 524 are generated, but the example embodiments are not limited thereto.

An example in which the second VM 513 without a normal and/or valid access authority to the first NS 523 maliciously and/or invalidly attempts to access the first NS 523 is described below.

When the second VM 513 generates a read request associated with a malicious access attempt to the first NS 523, the read request may be provided to the first VF 521 by adding, to the read request, information indicating a path to the first VF 521, and a memory address allocated to the first VM 512 and an NS ID indicating the first NS 523 may be included in the read request. In addition, in a packet encoding process according to and/or based on an interface with the storage device 520, VM information indicating the second VM 513 having generated the read request may be added to the read request.

The first VF 521 may decode the received read request, and abort processing of the read request by comparing VM information extracted as the decoding result to security information stored in the first security information storage circuit 521_2. In contrast, in conventional storage devices, the first VF 521 may read data from the first NS 523 indicated by the read request from the second VM 513, and may store a packet including the read data in an IOQ in the host memory 514, which is allocated to the first VM 512. However, according to at least one example embodiment, a memory address and an NS ID mapped to VM information indicating the second VM 513, which is extracted from the read request, may be read from the first security information storage circuit 521_2. The read security information may not match the memory address and the NS ID extracted from the read request, and accordingly, processing of the read request from the second VM 513 without a normal and/or access authority may be aborted, or in other words, the security access and/or security credentials of the VM requesting the memory operation may be verified, and if the verification is not successful, the requested memory operation may be aborted, cancelled, etc.

Figure 5:
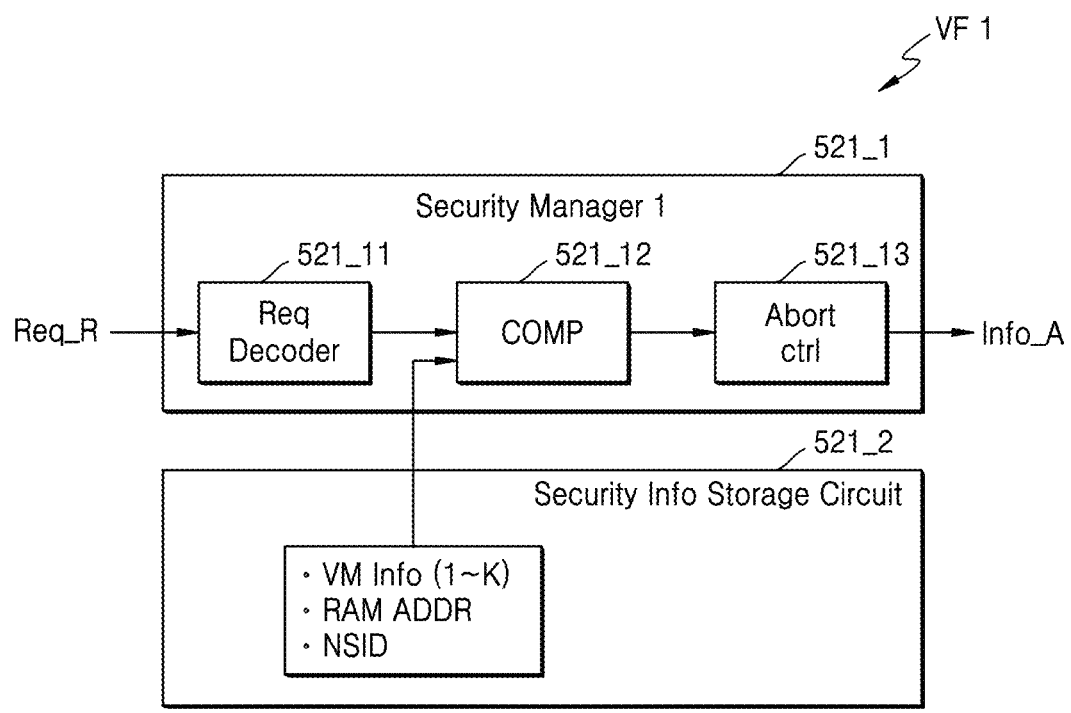
FIG. 5 is a block diagram illustrating an example of using security information, according to at least one example embodiment.

FIG. 5 is a block diagram illustrating an example of using security information, according to at least one example embodiment.

As an example of an operation of the first VF 521, the first security manager 521_1 may include a request decoder 521_11, a comparator 521_12, and/or an abort controller 521_13, but is not limited thereto. The first security information storage circuit 521_2 may store security information including a plurality of entries. The security information may include security information corresponding to each of a plurality of VMs accessible to the storage device 520, and may include, for example, VM information VM Info indicating and/or corresponding to each of the plurality of VMs, and a memory address RAM ADDR and an NS ID NSID as information mapped to the VM information VM Info, etc.

In at least one example embodiment, after security information is set in the storage device 520 in response to at least one command from the host 510, one or more VMs may be additionally generated in the host 510, and accordingly, the security information in the storage device 520 may be updated. For example, security information may be set for each of a plurality of VFs generated in the storage device 520, and when a VM is added and/or removed in the host 510, the security information set for each of the plurality of VFs may be accordingly updated.

The request decoder 521_11 may perform a decoding operation on a read request Req_R provided to the first VF 521, and may extract at least one piece of information from the read request Req_R. For example, the request decoder 521_11 may extract VM information indicating a VM having generated the read request Req_R, a memory address indicating a position of an IOQ, and/or an NS ID of an access target, etc. In at least one example embodiment, the VM information may be added to a packet in a packet generation process according to and/or based on an NVMe interface, and the memory address and the NS ID may be generated at a VM requesting a data access and included in the packet, etc.

The comparator 521_12 may perform a comparison operation by matching the information extracted by the request decoder 521_11 with the security information stored in the first security information storage circuit 521_2, and may provide the comparison result to the abort controller 521_13. The abort controller 521_13 may output an abort signal Info_A indicating whether to abort processing of the read request Req_R, based on the received comparison result, and the first VF 521 may abort processing of the read request Req_R in response to the abort signal Info_A to reduce and/or prevent an access to an NS from a VM without a normal and/or valid authority, but the example embodiments are not limited thereto. For example, the memory access request may be any memory operation besides a read request, including a write request, an erase request, a move request, an encryption request, a decryption request, etc.

Figure 6:
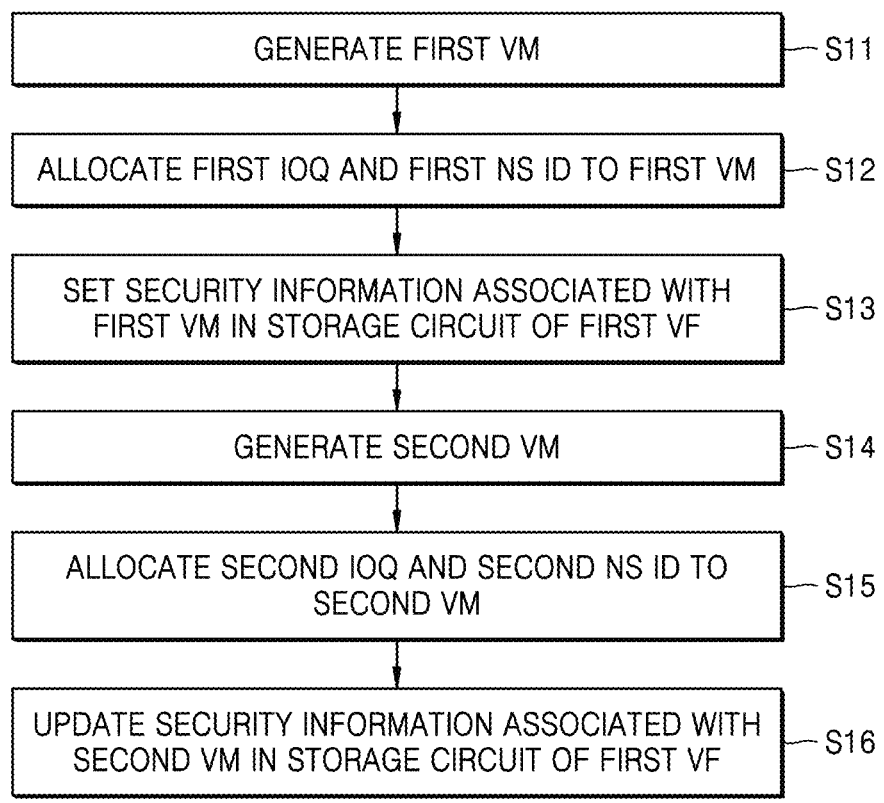
FIGS. 6 and 7 are flowcharts illustrating an operating method of a data processing system, according to some example embodiments.
Figure 7:
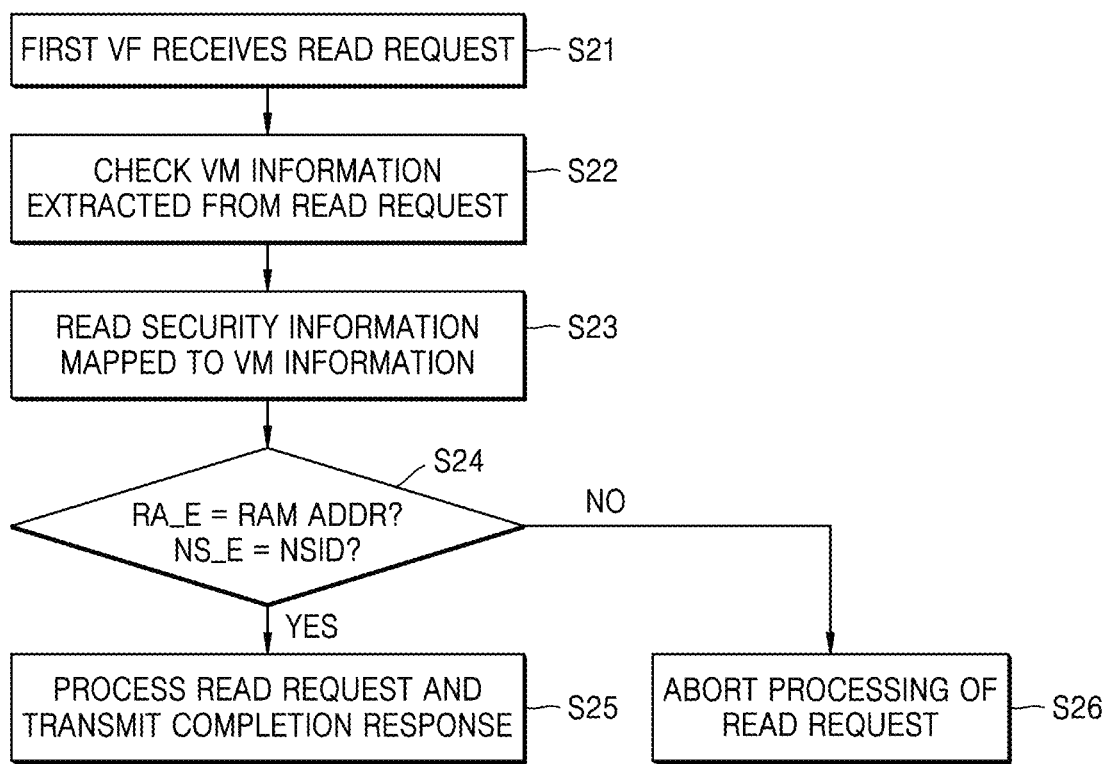

FIGS. 6 and 7 are flowcharts illustrating an operating method of a data processing system, according to some example embodiments. Some of operations shown in FIGS. 6 and 7 may be performed by a host, and the other operations may be performed by a storage device.

Referring to FIG. 6, the host and the storage device may comprise the data processing system, and a plurality of VMs may be generated in and/or by the host. For example, a VM manager in the host may generate a first VM in operation S11, and may perform various types and/or kinds of management for the first VM to access the storage device. For example, the VM manager may allocate a first IOQ and one or more associated first NS s to the first VM in operation S12. In addition, the VM manager may provide, to the first VM, a first NS ID and a first memory address indicating a position of the first IOQ allocated to the first VM in a host memory.

According to at least one example embodiment, in operation S13, the host may provide security information associated with the first VM to the storage device, and for example, a first VF corresponding to the first VM may be generated in the storage device in response to a request from the host. Security information regarding the plurality of VMs may be stored in the first VF, and for example, security information generated in association with the first VM may be set in (e.g., stored in and/or copied to, etc.) a storage circuit of the first VF. The security information may include various pieces of information, and for example, the security information may include VM information indicating, associated with, and/or corresponding to the first VM, such as the first memory address and the first NS ID as unique information associated with the first VM, which are mapped to the VM information associated with the first VM.

Thereafter, the host may generate an additional VM, e.g., generate a second VM, in operation S14. In addition, in operation S15, based on control by and/or instruction from the VM manager, a second IOQ at a different position from that of the first IOQ may be allocated to the second VM, and a second NS may be allocated to the second VM. In addition, the VM manager may provide, to the second VM, a second NS ID and a second memory address indicating the position of the second IOQ allocated to the second VM in the host memory.

The security information regarding and/or corresponding to each of the plurality of VMs generated in and/or by the host may be set in each of a plurality of VFs provided to the storage device, and accordingly, the host may provide security information generated in association with the second VM to the first VF and the security information associated with the second VM in the storage circuit of the first VF may be updated in operation S16.

FIG. 7 illustrates an example in which the storage device aborts and/or cancels processing of a read request from the host based on security information, but the example embodiments are not limited thereto, and for example, other types of data access requests may be verified, such as write requests, delete requests, copy requests, etc. According to at least one example embodiment, in operation S21, the first VF generated in the storage device may receive the read request from the host in operation S21, but the example embodiments are not limited thereto. When the first VF is generated in correspondence to the first VM of the host, the storage device may determine that the first VM has a normal and/or valid access authority to a first NS in the storage device, which the first VF accesses, whereas the storage device may determine that a VM (e.g., the second VM) other than the first VM does not have a normal and/or valid access authority to the first NS in the storage device.

A security manager in the first VF may extract various types and/or kinds of information through decoding the read request, according to some example embodiments, and may check, from the extracted information, VM information indicating and/or corresponding to a requesting VM having transmitted the read request in operation S22. In addition, the security information set in the first VF may include security information corresponding to each of the plurality of VMs, and security information corresponding to the VM information extracted from the read request may be read from a security information storage circuit in operation S23.

A comparison operation of determining whether a memory address RA_E included in the extracted VM information matches a memory address RAM_ADDR corresponding to the security information, and determining whether an NS ID NS_E included in the extracted VM information matches an NS ID NSID corresponding to the security information may be performed in operation S24. Processing of the read request may proceed or be aborted according to and/or based on the comparison result. For example, if at least one of the memory address RA_E and the NS ID NS_E extracted from the read request is different from at least one of the memory address RAM_ADDR and the NS ID NSID corresponding to the security information, the processing of the read request may be aborted in operation S26. Otherwise, if the memory address RA_E and the NS ID NS_E extracted from the read request are the same as the memory address RAM_ADDR and the NS ID NSID corresponding to the security information, the processing of the read request may proceed, and a completion response may be transmitted to the host in operation S25.

Figure 8:
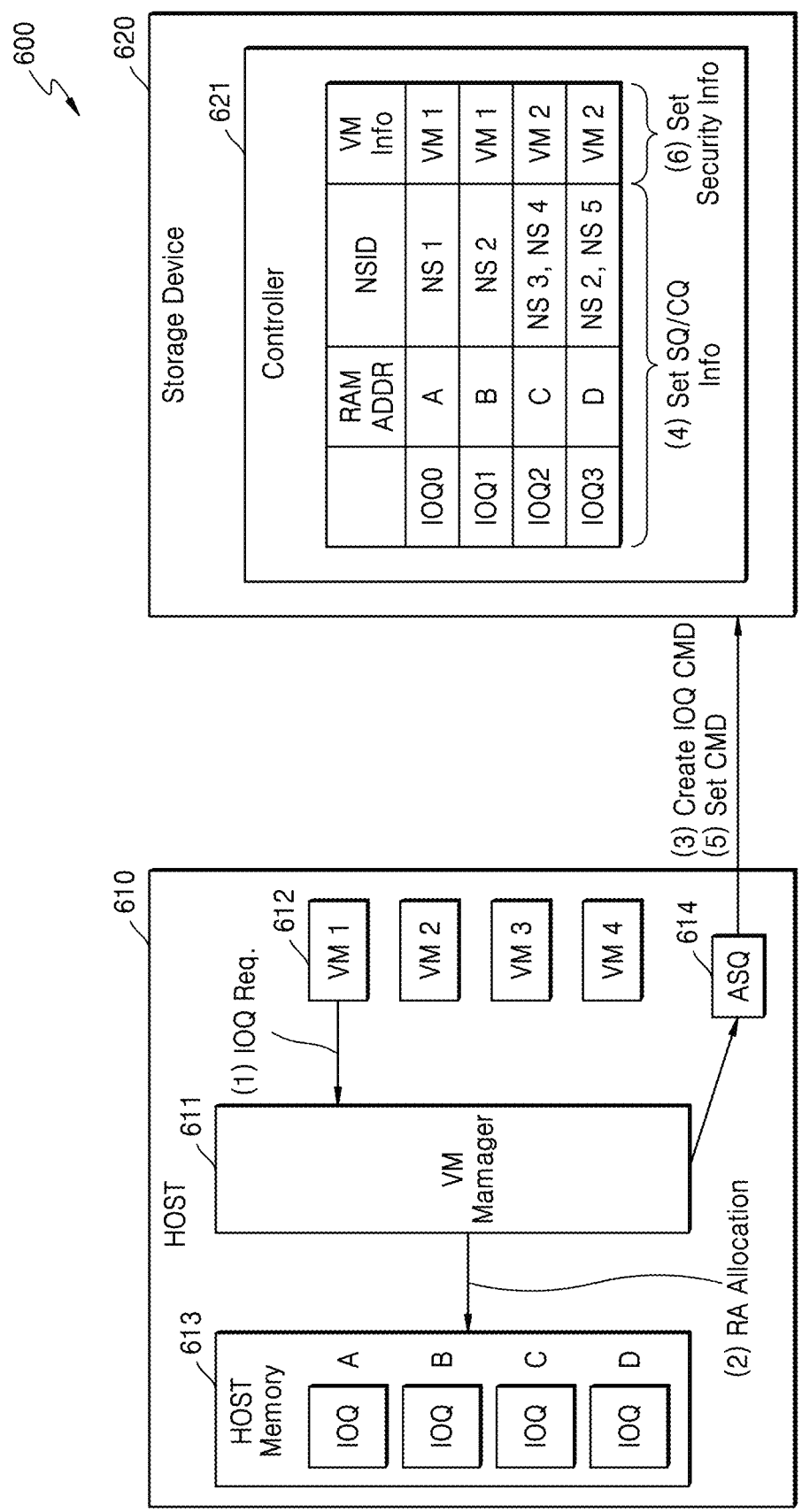
FIGS. 8 and 9 are block diagrams illustrating a process of setting and using security data, according to at least one example embodiment.
Figure 9:
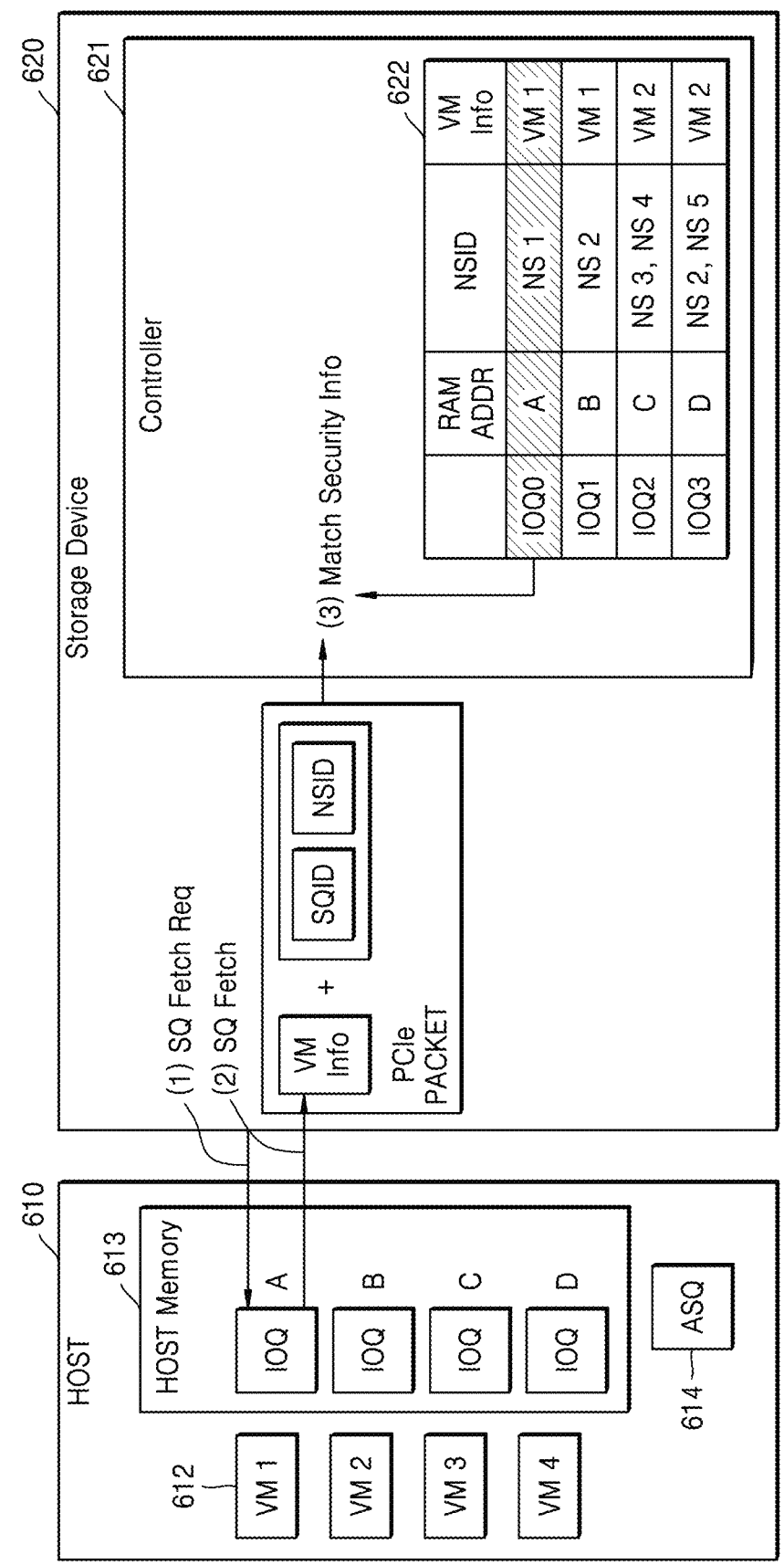

FIGS. 8 and 9 are block diagrams illustrating a process of setting and using security data, according to at least one example embodiment.

Referring to FIG. 8, a data processing system 600 may include at least one host 610 and at least one storage device 620, etc., but the example embodiments are not limited thereto. The host 610 may include at least one VM manager 611, one and/or more VMs, e.g., first to fourth VMs, etc., and/or at least one host memory 613, etc. In addition, the storage device 620 may include at least one controller 621 (e.g., memory controller and/or storage controller, etc.), and an access authority controller according to at least one example embodiment may be included in the controller 621, etc. In addition, the access authority controller may include a security manager and/or a security information storage circuit 622 according to some example embodiments. Although not shown in FIG. 9, a plurality of VFs may be implemented in and/or generated by the controller 621, and the security information storage circuit 622 may be included in each VF. In addition, the storage device 620 may include a plurality of NS s in and/or from which data is written and/or read based on control by the controller 621.

As an example of the first VM 612, the first VM 612 may request the VM manager 611 to generate an IOQ in association with the first VM 612. The VM manager 611 may allocate an IOQ to be used for communication between the first VM 612 and the storage device 620 and/or a memory address RA indicating the IOQ in the host memory 613, in response to the request.

The host 610 may provide, to the storage device 620, information associated with NSs and IOQs allocated to the first to fourth VMs, and for example, the host 610 may provide, to the storage device 620, a first command indicating that an IOQ has been generated. In at least one example embodiment, the host 610 may include an admin submission queue (ASQ) 614, and the first command may be transmitted via the ASQ 614, but the example embodiments are not limited thereto. The storage device 620 may store information associated with each of the first to fourth VMs in response to the first command, and for example, information about each generated IOQ, a memory address RAM_ADDR indicating a position of the IOQ, and information (e.g., an NS ID) indicating an NS, in which data is to be exchanged through the IOQ, may be stored in the security information storage circuit 622.

Thereafter, the host 610 may associate an NS with each of the first to fourth VMs, and according to the association result of NSs, the setting command in at least one example embodiment may be provided as a second command to the storage device 620, etc. The setting command may include information indicating an IOQ allocated to each of the first to fourth VMs, but is not limited thereto.

As shown in FIG. 8, the storage device 620 may store security information in the security information storage circuit 622, in response to the setting command from the host 610, and for example, first VM information VM 1 may be mapped to memory addresses A and B indicating first and second IOQs IOQ0 and IOQ1 and mapped to NS IDs indicating first and second NSs NS 1 and NS 2, etc. Likewise, second VM information VM 2 may be mapped to memory addresses C and D indicating third and fourth IOQs IOQ2 and IOQ3 and mapped to NS IDs indicating second to fifth NSs NS 2 to NS 5. In at least one example embodiment, a data access to the third and fourth NSs NS 3 and NS 4 may be performed through the third IOQ IOQ2, and a data access to the second and fifth NSs NS 2 and NS 5 may be performed through the fourth IOQ IOQ3, but the example embodiments are not limited thereto.

FIG. 9 illustrates a matching operation on security information, according to at least one example embodiment. Referring to FIG. 9, the first VM 612 may store at least one packet according to an NVMe interface in the first IOQ IOQ0 as a read request, and the storage device 620 may transmit, to the host 610, a request for fetching information about an SQ in the first IOQ IOQ0, etc. In addition, the read request stored in the SQ in the first IOQ IOQ0 may be transmitted to the storage device 620.

The storage device 620 may decode the read request to extract various information included in the read request, and for example, may extract an NS ID NSID indicating an NS of an access target of the read request together with information (e.g., VM Info, etc.) about and/or related to a VM having generated the read request (e.g., the requesting VM) and a memory address (and/or information (e.g., SQID) of an SQ) indicating a position of an IOQ, etc. Security information stored in the controller 621 may include a plurality of entries, and from an entry corresponding to the VM information VM Info of the requesting VM extracted from a read request, information mapped to the VM information VM Info may be compared to information extracted from the read request. For example, the controller 621 may check, determine, verify, and/or authenticate, etc., whether information (an SQID) about an and/or corresponding to an SQ belongs to and/or matches a memory address RAM ADDR included in the security information, etc. The controller 621 may determine whether an NS ID NSID extracted from the read request is the same as an NS ID NSID included in the security information.

Figure 10:
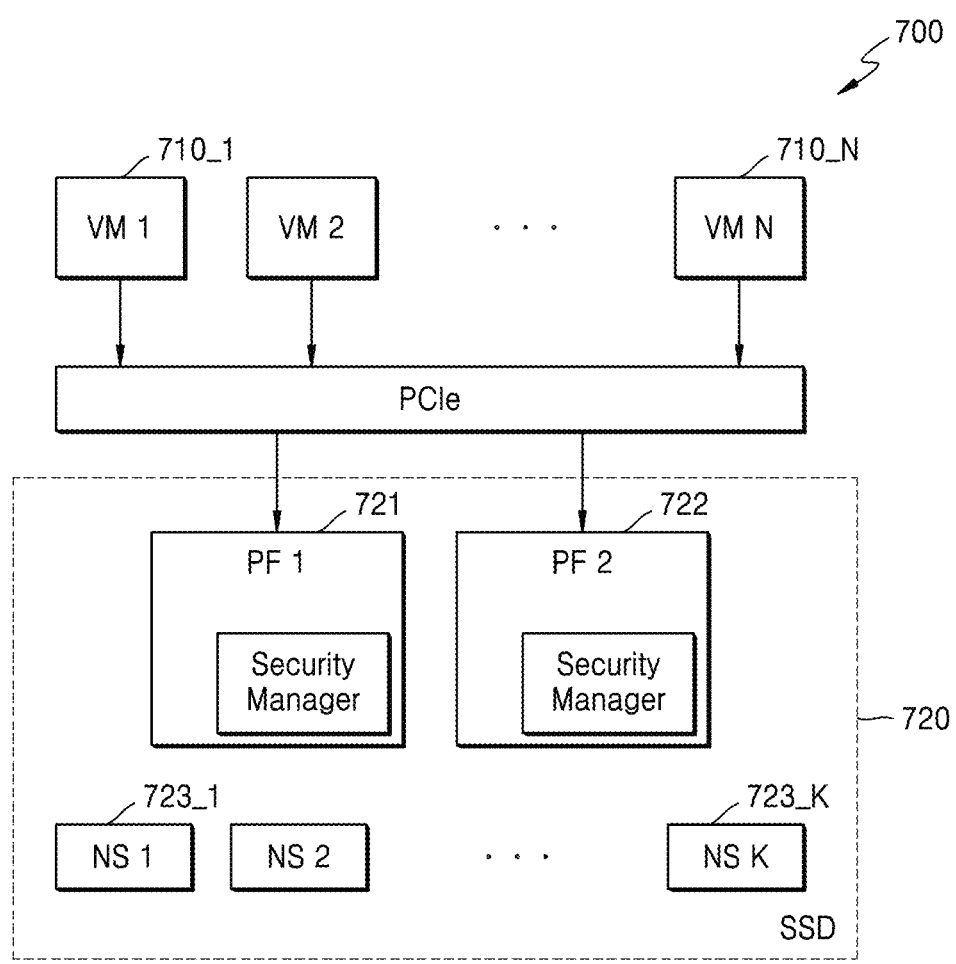
FIG. 10 is a block diagram illustrating a data processing system according to at least one example embodiment.

FIG. 10 is a block diagram illustrating a data processing system 700 according to at least one example embodiment. FIG. 10 illustrates a case where at least one example embodiment is applied to a PCIe physical function (PF) when the SR-IOV technology is not applied to a storage device.

Referring to FIG. 10, the data processing system 700 may include a plurality of VMs 710_1 to 710_N included in at least one host, and the plurality of VMs 710_1 to 710_N may communicate with at least one storage device (e.g., an SSD 720) via a PCIe bus, but is not limited thereto. The SSD 720 may include a first PF 721 and a second PF 722 as one and/or more PFs and also include a plurality of NS s 723_1 to 723_K, but is not limited thereto.

The host may allocate different IDs to the first and second PFs 721 and 722 to identify accesses through the first PF 721 and the second PF 722, and according to and/or based on an ID added to an access request from the host, the access request may be provided to the first PF 721 and/or the second PF 722 via the PCIe bus. Each of the first PF 721 and the second PF 722 may include an access authority controller (and/or a security manager) according to at least one example embodiment, and security information regarding the plurality of VMs 710_1 to 710_N according to some example embodiments may be stored in each of the first PF 721 and the second PF 722.

The plurality of VMs 710_1 to 710_N may access one or more NS s via the first PF 721 and/or the second PF 722, and to determine an access authority, each of the first PF 721 and the second PF 722 may perform a matching operation using security information according to some example embodiments. According to a matching result using the security information, processing of an access request by a VM may proceed or be aborted.

Figure 11:
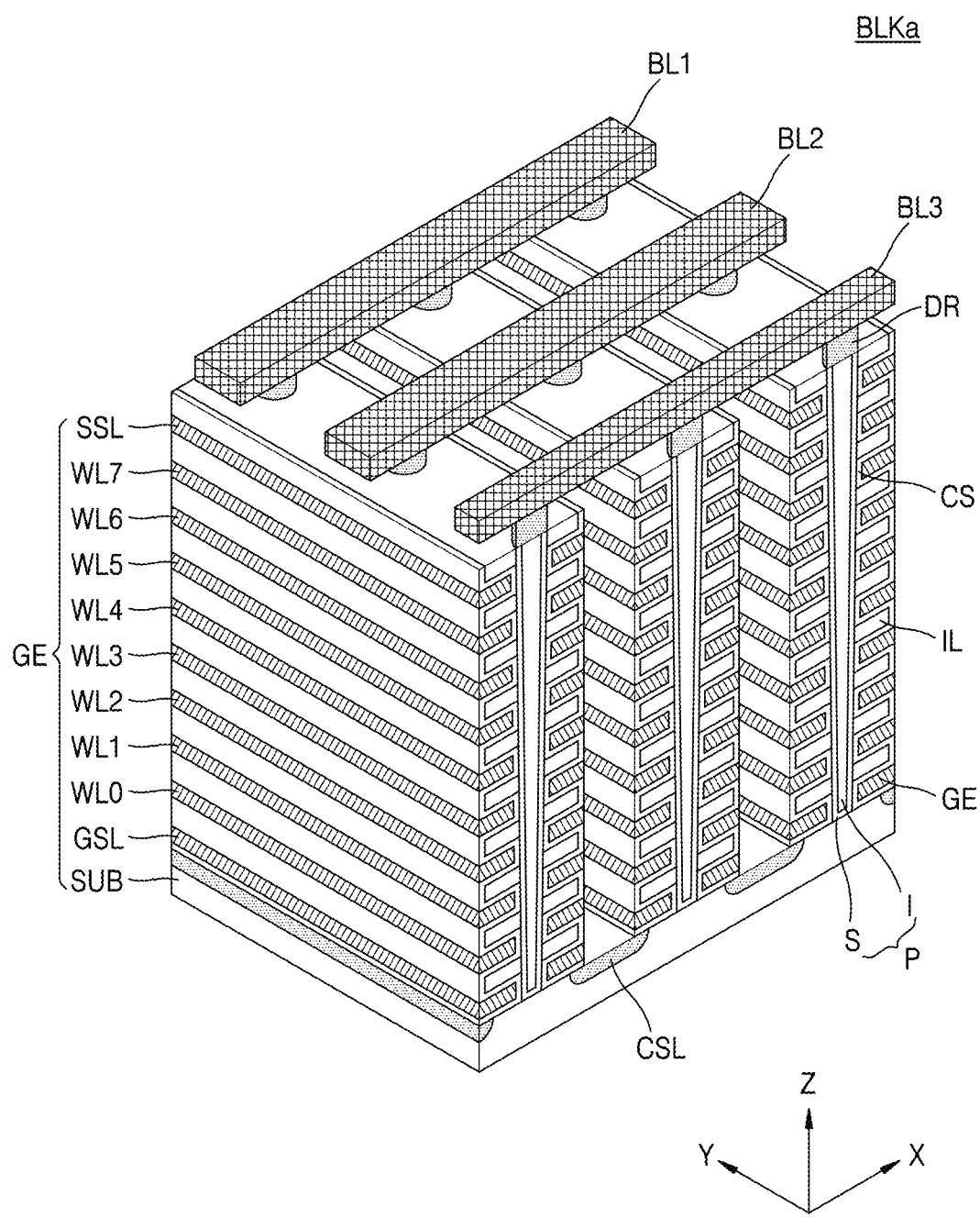
FIG. 11 is a perspective view illustrating an implementation example of a cell block included in a nonvolatile memory according to at least one example embodiment.

FIG. 11 is a perspective view illustrating an implementation example of a cell block BLKa included in an NVM according to at least one example embodiment.

Referring to FIG. 11, the cell block BLKa, which may be allocated to an NS of at least one example embodiment of the inventive concepts, may have a three-dimensional structure, but the example embodiments are not limited thereto. For example, the cell block BLKa is formed in a vertical direction VD with respect to a substrate SUB, the substrate SUB has a first conductive type (e.g., p type), and common source lines CSL each extending in a second horizontal direction HD2 and doped with impurities of a second conductive type (e.g., n type) are provided on the substrate SUB. A plurality of insulating layers IL extending in the second horizontal direction HD2 are sequentially provided in the vertical direction VD in a region of the substrate SUB between two adjacent common source lines CSL, and the plurality of insulating layers IL are separated from each other by a particular distance in the vertical direction VD. For example, the plurality of insulating layers IL may include an insulating material, such as silicon oxide, etc.

A plurality of pillars P sequentially arranged in a first horizontal direction HD1 and passing through the plurality of insulating layers IL in the vertical direction are provided in a region of the substrate SUB between two adjacent common source lines CSL. For example, the plurality of pillars P may be in contact with the substrate SUB by passing through the plurality of insulating layers IL, but are not limited thereto. Additionally, a surface layer S of each pillar P may include a silicon material having a first type and may function as a channel region. An internal layer I of each pillar P may include an insulating material, such as silicon oxide, etc., and/or an air gap.

In a region between two adjacent common source lines CSL, a charge storage layer CS is provided along exposed surfaces of insulating layers IL, pillars P, and/or the substrate SUB. The charge storage layer CS may include a gate insulating layer (and/or a tunneling insulating layer), a charge trap layer, and/or a blocking insulating layer, etc. For example, the charge storage layer CS may have an oxide-nitride-oxide (ONO) structure, but is not limited thereto. In addition, in a region between two adjacent common source lines CSL, a gate electrode GE including select lines GSL and SSL and word lines WL0 to WL7 is provided to an exposed surface of the charge storage layer CS.

Drains and/or drain contacts DR are provided on the plurality of pillars P, respectively. For example, the drains and/or drain contacts DR may include a silicon material doped with impurities having the second conductive type, but are not limited thereto. Bit lines BL1 to BL3 extending in the first horizontal direction HD1 and separated from each other by a particular distance in the second horizontal direction HD2 are provided on the drains and/or drain contacts DR.

Figure 12:
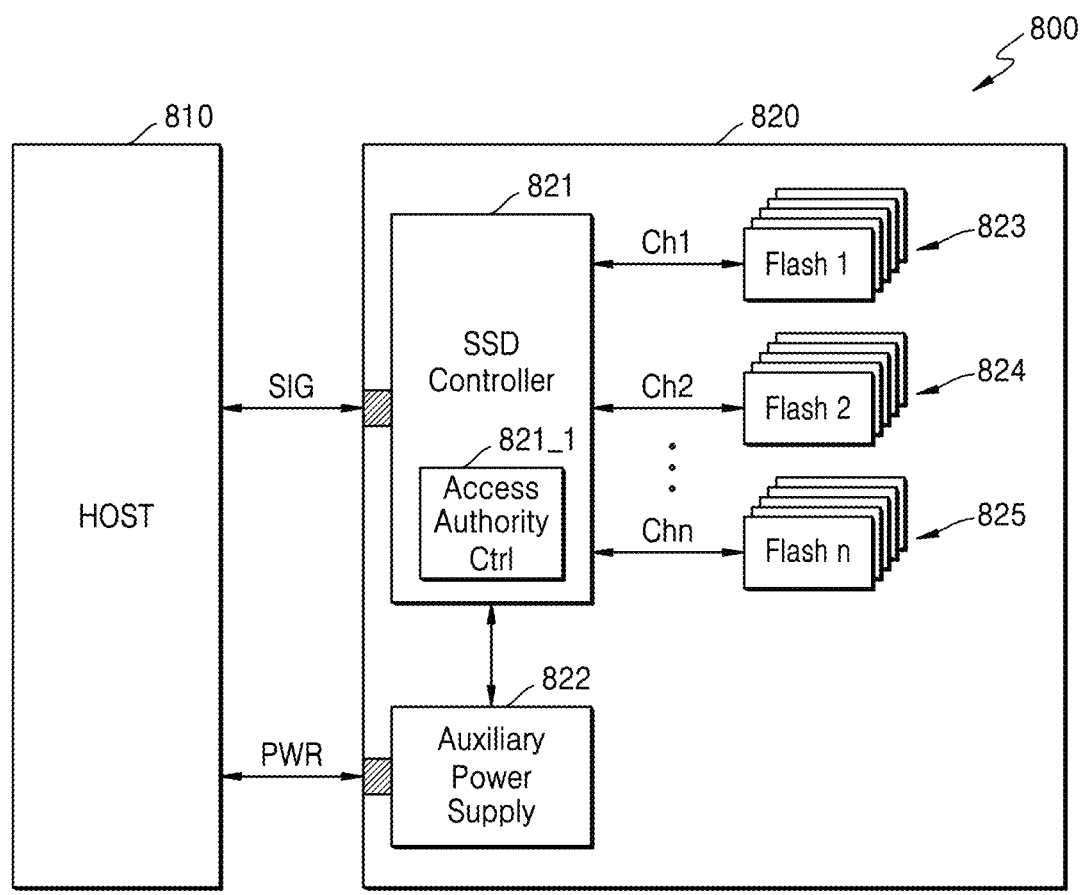
FIG. 12 is a block diagram illustrating a case in which a solid state drive (SSD) is applied to a storage device in a data processing system according to some example embodiments.

FIG. 12 is a block diagram illustrating a case in which an SSD 820 is applied to a storage device in a data processing system 800 according to some example embodiments.

Referring to FIG. 12, the data processing system 800 may include at least one host 810 and the SSD 820, etc. The SSD 820 exchanges signals with the host 810 through at least one signal connector and receives power through at least one power connector. The SSD 820 may include an SSD controller 821, an auxiliary power supply 822, and a plurality of NVM devices 823 to 825, etc. The NVM devices 823 to 825 may be vertical-stacked NAND flash memory devices, but are not limited thereto. Herein, the SSD 820 may be implemented using the one or more of the example embodiments described above with reference to FIGS. 1 to 11, but are not limited thereto. That is, the SSD controller 821 may include an access authority controller 821_1, and the access authority controller 821_1 may include security information stored in response to a setting command from the host 810. In addition, every time an access request is received from a plurality of VMs generated in the host 810, the access authority controller 821_1 may perform an access authority determination (e.g., verification and/or authentication) operation using the security information and VM information extracted from the access request, and may abort processing of the access request according to and/or based on the determination result.

Figure 13:
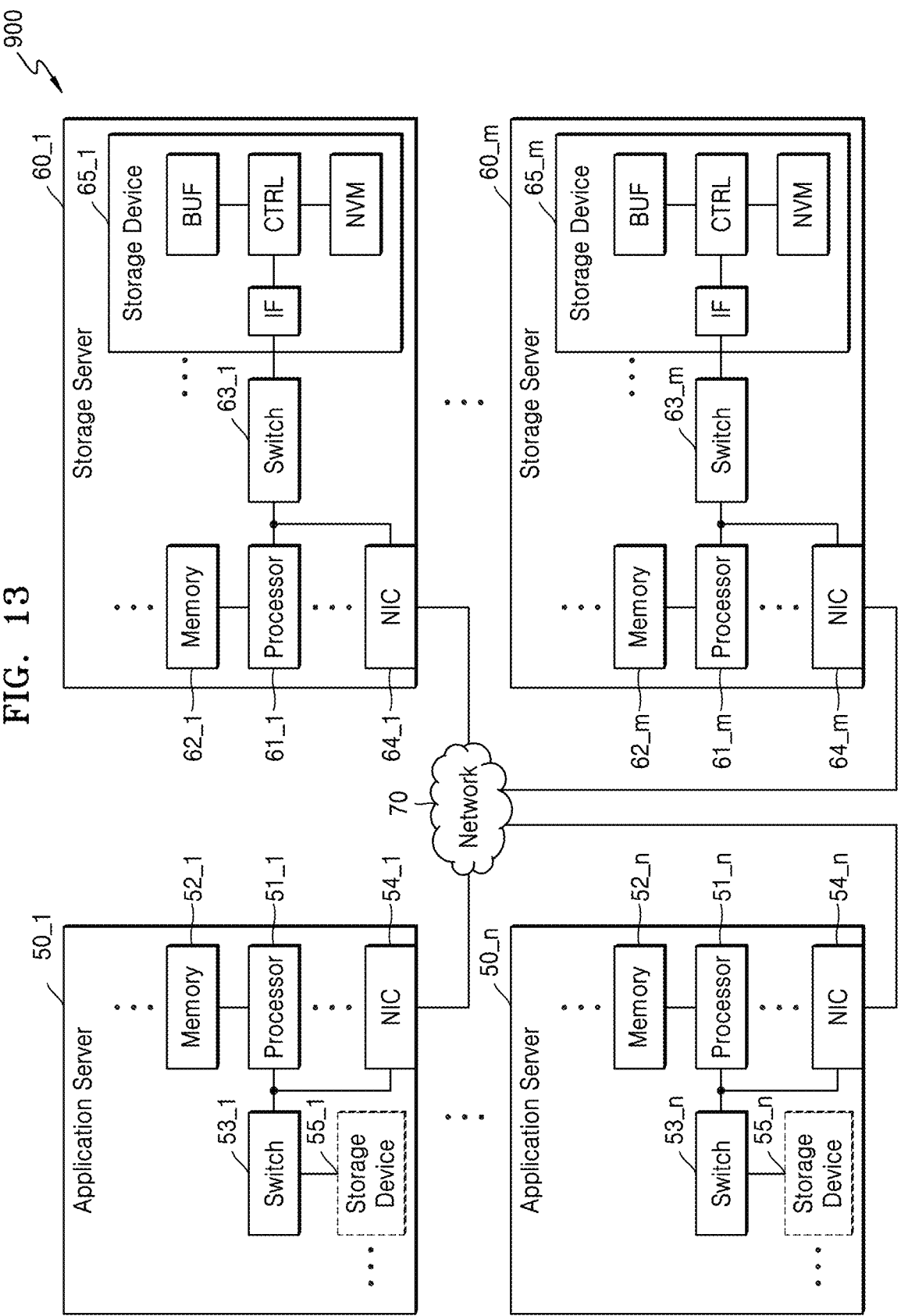
FIG. 13 is a block diagram illustrating a data center including a storage device according to at least one example embodiment.

FIG. 13 is a block diagram illustrating a data center 900 including a storage device according to at least one example embodiment. In some example embodiments, the storage device described above with reference to the drawings may be included in an application server and/or a storage server, etc., in the data center 900.

Referring to FIG. 13, the data center 900 may collect and/or store various pieces of data, provide a service, and be referred to as a data storage center. For example, the data center 900 may be a system for operating a search engine and a database and/or a computing system used in a company, such as a bank, business, and/or a government organization, etc. As shown in FIG. 13, the data center 900 may include application servers 50_1 to 50_n and storage servers 60_1 to 60_m. The number n of application servers 50_1 to 50_n and the number m of storage servers 60_1 to 60_m may be variously selected according to the example embodiments, and n may differ from m.

The application server 50_1, . . . , and/or 50_n may include at least one of a processor 51_1, . . . , and/or 51_n, a memory 52_1, . . . , and/or 52_n, a switch 53_1, . . . , and/or 53_n, a network interface controller (NIC) 54_1, . . . , and/or 54_n, and a storage device 55_1, . . . , and/or 55_n, etc. The processor 51_1, . . . , and/or 51_n may control a general operation of the application server 50_1, . . . , and/or 50_n, and may access the memory 52_1, . . . , and/or 52_n to execute instructions and/or data loaded in the memory 52_1, . . . , and/or 52_n. The memory 52_1, . . . , and/or 52_n may include, as a non-limiting example, double data rate synchronous dynamic random access memory (DDR SDRAM), a high bandwidth memory (HBM), a hybrid memory cube (HMC), a dual in-line memory module (DIMM), an Optane DIMM, and/or nonvolatile DIMM (NVDIMM), etc.

According to at least one example embodiment, the number of processors and the number of memories included in the application server 50_1, . . . , and/or 50_n may be variously selected. In some example embodiments, the processor 51_1, . . . , and/or 51_n and the memory 52_1, . . . , and/or 52_n may provide a processor-memory pair, but are not limited thereto. In some example embodiments the number of processors 51_1, . . . , and/or 51_n may differ from the number of memories 52_1, . . . , and/or 52_n. The processor 51_1, . . . , and/or 51_n may include a single-core processor and/or a multi-core processor. In some example embodiments, as shown with dashed line in FIG. 13, the storage device 55_1, . . . , and/or 55_n may be omitted from the application server 50_1, . . . , and/or 50_n. The number of storage devices 55_1, . . . , and/or 55_n included in the application server 50_1, . . . , and/or 50_n may be variously selected according to some example embodiments. The processor 51_1, . . . , and/or 51_n, the memory 52_1, . . . , and/or 52_n, the switch 53_1, . . . , and/or 53_n, the NIC 54_1, . . . , and/or 54_n, and/or the storage device 55_1, . . . , and/or 55_n may communicate with each other via a link described above with reference to the drawings.

The storage server 60_1, . . . , and/or 60_m may include at least one of a processor 61_1, . . . , and/or 61_m, a memory 62_1, . . . , and/or 62_m, a switch 63_1, . . . , 63_m, an NIC 64_1, . . . , and/or 64_m, and/or a storage device 65_1, . . . , and/or 65_m. The processor 61_1, . . . , and/or 61_m and/or the memory 62_1, . . . , and/or 62_m may operate similar to the processor 51_1, . . . , and/or 51_n and the memory 52_1, . . . , and/or 52_n in the application server 50_1, . . . , and/or 50_n described above, but the example embodiments are not limited thereto.

A storage device according to some example embodiments may be applied to the storage devices 55_1 to 55_n and the storage devices 65_1 to 65_m included in the data center 900, and accordingly, an access authority controller and/or a security manager according to some example embodiments, which is configured to determine a data access authority, may be included in the storage devices 55_1 to 55_n and the storage devices 65_1 to 65_m. In addition, security information may be stored in the storage devices 55_1 to 55_n and the storage devices 65_1 to 65_m, and when a virtualization function is applied to the data center 900, the storage devices 55_1 to 55_n and/or the storage devices 65_1 to 65_m may abort and/or cancel processing of an access request from a VM determined to be without a normal and/or valid access authority.

The application servers 50_1 to 50_n and the storage servers 60_1 to 60_m may communicate with each other via a network 70. In some example embodiments, the network 70 may be implemented using a fibre channel (FC), an Ethernet, and/or the like. The FC may be a medium used for relatively high-speed data transmission, and an optical switch configured to provide high performance/high availability may be used in the FC. According to an access scheme of the network 70, the storage servers 60_1 to 60_m may be provided as a file storage, a block storage, and/or an object storage, etc.

In some example embodiments, the network 70 may be a storage-exclusive network, such as a storage area network (SAN), etc. For example, the SAN may be an FC-SAN, which may use an FC network and is implemented according to an FC protocol (FCP), but is not limited thereto. As another example, the SAN may be an Internet protocol (IP)-SAN, which uses a transmission control protocol (TCP)/IP network and is implemented according to an SCSI over TCP/IP and/or Internet SCSI (iSCSI) protocol. In some example embodiments, the network 70 may be a general network, such as a TCP/IP network, etc. For example, the network 70 may be implemented according to an FC over Ethernet (FCoE) protocol, a network attached storage (NAS) protocol, an NVMe over fabrics (NVMe-oF) protocol, and/or the like.

Hereinafter, although the application server 50_1 and the storage server 60_1 are mainly described, a description of the application server 50_1 may also be applied to the other application servers (e.g., 50_n), and a description of the storage server 60_1 may also be applied to the other storage servers (e.g., 60_m), etc.

The application server 50_1 may store data, which a user and/or a client requests to store, in one of the storage servers 60_1 to 60_m via the network 70. In addition, the application server 50_1 may obtain data, which the user and/or the client requests to read, from one of the storage servers 60_1 to 60_m via the network 70. For example, the application server 50_1 may be implemented by a web server and/or a database management system (DBMS).

The application server 50_1 may access the memory 52_n and/or the storage device 55_n included in another application server 50_n via the network 70 and/or access the memories 62_1 to 62_m and/or the storage devices 65_1 to 65_m included in the storage servers 60_1 to 60_m via the network 70. Accordingly, the application server 50_1 may perform various operations on data stored in the application servers 50_1 to 50_n and/or the storage servers 60_1 to 60_m. For example, the application server 50_1 may execute instructions for moving and/or copying data among the application servers 50_1 to 50_n and/or the storage servers 60_1 to 60_m. In this case, the data may move from the storage devices 65_1 to 65_m in the storage servers 60_1 to 60_m to the memories 52_1 to 52_n in the application servers 50_1 to 50_n via the memories 62_1 to 62_m in the storage servers 60_1 to 60_m and/or directly. In some example embodiments, data moving via the network 70 may be data encrypted for security and/or privacy.

In the storage server 60_1, an interface IF may provide a physical connection between the processor 61_1 and a controller CTRL, and may provide a physical connection between the NIC 64_1 and the controller CTRL, etc. For example, the interface IF may be implemented by a direct attached storage (DAS) scheme of directly connecting the storage device 65_1 by using a dedicated cable, but the example embodiments are not limited thereto. In addition, for example, the interface IF may be implemented by various interface schemes, such as ATA, SATA, external SATA (e-SATA), SCSI, SAS, PCI, PCIe, NVMe, Institute of Electrical and Electronics Engineers (IEEE) 1394, USB, secure digital (SD) card, MMC, embedded MMC (eMMC), universal flash storage (UFS), embedded UFS (eUFS), compact flash (CF) card interface, and/or CXL, etc.

In the storage server 60_1, the switch 63_1 may selectively connect the processor 61_1 to the storage device 65_1 and/or selectively connect the NIC 64_1 to the storage device 65_1, under control by the processor 61_1, but the example embodiments are not limited thereto.

In some example embodiments, the NIC 64_1 may include a network interface card, a network adaptor, or the like. The NIC 64_1 may be connected to the network 70 through a wired interface, a wireless interface, a Bluetooth interface, an optical interface, or the like. The NIC 64_1 may include an internal memory, a digital signal processor (DSP), a host bus interface, and the like, and may be connected to the processor 61_1, the switch 63_1, and/or the like through the host bus interface. In some example embodiments, the NIC 64_1 may be integrated with at least one of the processor 61_1, the switch 63_1, and the storage device 65_1, etc.

In the application server 50_1, . . . , and/or 50_n and/or the storage server 60_1, . . . , and/or 60_m, the processor 51_1, . . . , 51_n, 61_1, . . . , and/or 61_m may transmit a command to the storage device 55_1, . . . , 55_n, 65_1, . . . , and/or 65_m and/or the memory 52_1, . . . , 52_n, 62_1, . . . , and/or 61_m to program and/or read data. In this case, the data may be data error-corrected by an ECC engine, but is not limited thereto. The data may be data bus inversion (DBI) and/or data masking-processed data and may include cyclic redundancy code (CRC) information. The data may be data encrypted for security and/or privacy.

The storage device 55_1, . . . , 55_n, 65_1, . . . , and/or 65_m may transmit a control signal and/or a command/address signal to an NVM device (e.g., a NAND flash memory device) NVM in response to a read command received from the processor 51_1, . . . , 51_n, 61_1, . . . , and/or 61_m, etc. Accordingly, when data is read from the NVM device NVM, a read enable signal is input as a data output control signal and causes the data to be output to a data queue (DQ) bus. A data strobe signal may be generated using the read enable signal. The command/address signal may be latched in response to a leading edge and/or a trailing edge of a write enable signal.

The controller CTRL may generally control an operation of the storage device 65_1. In at least one example embodiment, the controller CTRL may include static random access memory (SRAM). The controller CTRL may write data in the NVM device NVM in response to a write command and/or read data from the NVM device NVM in response to a read command. For example, the write command and/or the read command may be generated based on a request provided from a host, e.g., the processor 61_1 in the storage server 60_1, the processor 61_m in another storage server 60_m, and/or the processor 51_1, . . . , and/or 51_n in the application server 50_1, . . . , and/or 50_n. A buffer BUF may temporarily store (buffer) data to be written in the NVM device NVM and/or data read from the NVM device NVM. In some example embodiments, the buffer BUF may include DRAM, but is not limited thereto. In addition, the buffer BUF may store metadata, and the metadata may indicate user data and/or data generated by the controller CTRL to manage the NVM device NVM, etc. The storage device 65_1 may include a secure element (SE) for security and/or privacy, but is not limited thereto.

While various example embodiments of the inventive concepts have been particularly shown and described herein, it will be understood that various changes in form and details may be made therein without departing from the spirit and scope of the following claims.

What is claimed is:

1. A storage device for communicating with a host device, the storage device comprising:
nonvolatile memory comprising a plurality of cell blocks, the plurality of cell blocks allocated into a plurality of namespaces, each of the plurality of namespaces associated with at least one virtual machine of a plurality of virtual machines generated by the host device; and
processing circuitry configured to,
store a plurality of security information associated with the plurality of namespaces in response to a command from the host device, each of the security information including virtual machine information associated with a corresponding one of the plurality of virtual machines and unique information associated with the corresponding virtual machine, the virtual machine information including an identifier for the corresponding virtual machine, and the unique information including, a memory address indicating a position of an input/output queue allocated to the corresponding virtual machine in host memory included in the host device, extract at least first information by decoding a data access request received from the host device, and abort processing of the data access request based on the virtual machine information, the unique information, and the extracted at least one first information.

2. The storage device of claim 1, wherein each of the virtual machine information includes a virtual machine identifier unique to the corresponding virtual machine; and each of the unique information further includes a namespace identifier (ID) indicating a namespace associated with the corresponding virtual machine.

3. The storage device of claim 2, wherein, in response to an additional virtual machine being generated by the host device, the processing circuitry is further configured to generate security information regarding the additional virtual machine.

4. The storage device of claim 1, wherein the processing circuitry further includes a plurality of virtual functions corresponding to the plurality of virtual machines, and each of the plurality of virtual functions is configured to,
store the security information associated with the corresponding virtual machine, and
determine access authority of the corresponding virtual machine based on the stored security information associated with the corresponding virtual machine in response to a data access request received from the corresponding virtual machine.

5. The storage device of claim 4, wherein the plurality of virtual functions are configured to provide access to the virtual machines to the nonvolatile memory through a plurality of independent paths according to virtualization technology.

6. The storage device of claim 4, wherein a first virtual function of the plurality of virtual functions is configured to:
receive, as the data access request, a read request from a first virtual machine of the plurality of virtual machines;
extract the first information included in the read request by decoding the read request; and
process the read request from the first virtual machine based on the first information included in the read request matching the unique information corresponding to the first virtual machine.

7. The storage device of claim 4, wherein a first virtual function of the plurality of virtual functions is configured to:
receive, as the data access request, a read request from a second virtual machine of the plurality of virtual machines;
extract the first information included in the read request by decoding the read request; and
abort processing of the read request from the second virtual machine based on the first information included in the read request not matching the unique information corresponding to the second virtual machine.

8. The storage device of claim 1, wherein
the nonvolatile memory comprises a plurality of flash memory chips;
each flash memory chip includes a subset of the plurality of cell blocks; and
each of the plurality of namespaces includes at least one cell block.

9. An operating method of a storage device for communicating with a host device, the storage device comprising a plurality of namespaces, and each namespace comprising at least one cell block, the operating method comprising:
receiving a setting command from the host device;
storing a plurality of security information, in response to the setting command, the plurality of security information including a plurality of virtual machine information associated with each virtual machine of a plurality of virtual machines, the virtual machines being generated by the host device, each of the virtual machine information including a memory address indicating a position in a host memory of an input/output queue associated with the associated virtual machine, and a namespace identifier (ID) indicating a namespace associated with the virtual machine; and
selectively aborting processing of a read request received from the host device based on the virtual machine information, the memory address indicating the position in the host memory of the input/output queue associated with the associated virtual machine, and information extracted from the read request.

10. The operating method of claim 9, wherein the virtual machine information includes an indication for the associated virtual machine, and the memory address and the namespace ID are mapped to the respective virtual machine information.

11. The operating method of claim 10, further comprising:
comparing the namespace ID corresponding to the virtual machine information extracted from the read request to additional information extracted from the read request.

12. The operating method of claim 9, further comprising:
updating the plurality of security information with new virtual machine information regarding a new virtual machine generated by the host device, the virtual machine information including a memory address and a namespace ID corresponding to the new virtual machine, the memory address and the namespace ID mapped to the new virtual machine information.

13. The operating method of claim 9, further comprising:
generating a plurality of virtual functions corresponding to the plurality of virtual machines in response to a request from the host device,
wherein the plurality of security information regarding the plurality of virtual machines are stored in the corresponding virtual function.

14. The operating method of claim 13, wherein the selectively aborting the processing of the read request comprises:
decoding, by a first virtual function of the plurality of virtual functions, a read request received from a first virtual machine of the plurality of virtual machines, and extracting a memory address and a namespace ID from the read request; and
processing the read request from the first virtual machine based on the extracted information matching the memory address and the namespace ID mapped to the virtual machine information corresponding to the first virtual machine.

15. The operating method of claim 13, wherein the selectively aborting the processing of the read request comprises:
decoding, by a first virtual function of the plurality of virtual functions, a read request received from a second virtual machine of the plurality of virtual machines, and extracting a memory address and a namespace identifier ID from the read request; and aborting processing of the read request from the second virtual machine based on the extracted information not matching the memory address and the namespace ID mapped to the virtual machine information corresponding to the second virtual machine.

16. The operating method of claim 9, wherein the security information is stored in a volatile memory in the storage device; and the receiving the setting command is performed when initially operating the storage device.

17. A host device for accessing a plurality of namespaces provided to a storage device, the host device comprising:

a host memory comprising a plurality of input/output queues allocated to at least one virtual machine of a plurality of virtual machines; and processing circuitry configured to, manage generation of the plurality of virtual machines and the allocation of the plurality of input/output queues in the host memory to the plurality of virtual machines, each of the virtual machines configured to generate a read request for accessing the plurality of namespaces through independent paths according to virtualization technology, and transmit a setting command to a storage device, the setting command including a plurality of security information associated with the plurality of virtual machines, each of the plurality of security information including virtual machine information identifying the associated virtual machine, a memory address indicating a position of an input/output queue allocated to the associated virtual machine, and a namespace identifier (ID) indicating a namespace associated with the virtual machine.

18. The host device of claim 17, wherein each of the virtual machine information identifying a single virtual machine, and the memory address and the namespace ID are mapped to an associated virtual machine information.

19. The host device of claim 17, wherein a first virtual machine of the plurality of virtual machines is associated with a first namespace of the storage device; and in response to a second virtual machine of the plurality of virtual machines transmitting a read request to the storage device, the read request including the memory address corresponding to the first virtual machine or the namespace ID associated with the first namespace, completion of the read request from the second virtual machine is blocked.

* * * * *